C. C. HANSEN.
DRILL MOUNTING.
APPLICATION FILED JAN. 12, 1910.

1,112,006.

Patented Sept. 29, 1914.
2 SHEETS—SHEET 1.

Witnesses:

Inventor:

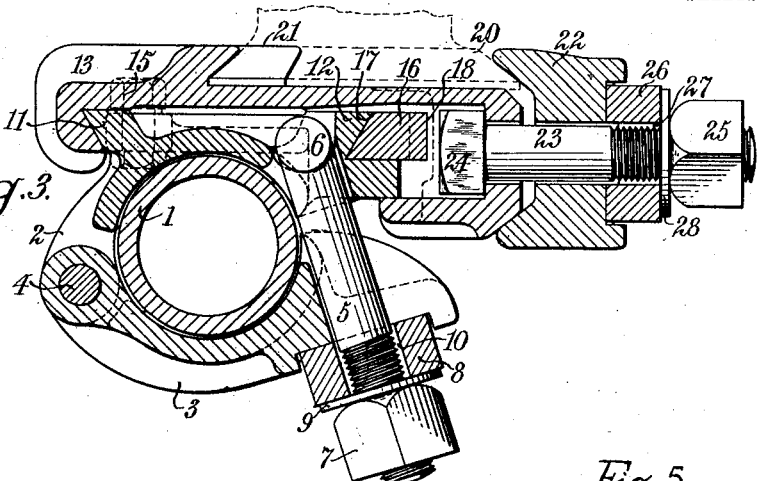

UNITED STATES PATENT OFFICE.

CHARLES C. HANSEN, OF EASTON, PENNSYLVANIA, ASSIGNOR TO INGERSOLL-RAND COMPANY, OF NEW YORK, N. Y., A CORPORATION OF NEW JERSEY.

DRILL-MOUNTING.

1,112,006.　　　Specification of Letters Patent.　　Patented Sept. 29, 1914.

Application filed January 12, 1910. Serial No. 537,734.

*To all whom it may concern:*

Be it known that I, CHARLES C. HANSEN, a citizen of the United States, and resident of Easton, in the county of Northampton and State of Pennsylvania, have invented new and useful Improvements in Drill-Mountings, of which the following is a specification.

This invention relates to improvements in drill mountings and more particularly to a mounting in which the saddle which carries the drill may be moved to one side to bring the drill out of alinement with the hole being bored for permitting the shifting of the drill steels as the hole becomes deeper.

The object of this invention is to provide novel means which may be operated for quickly locking the clamp to and releasing it from its support; for locking the saddle to and releasing it from the clamp and for locking the drill shell to and releasing it from the saddle.

A practical embodiment of my invention is represented in the accompanying drawings, in which—

Figure 1:
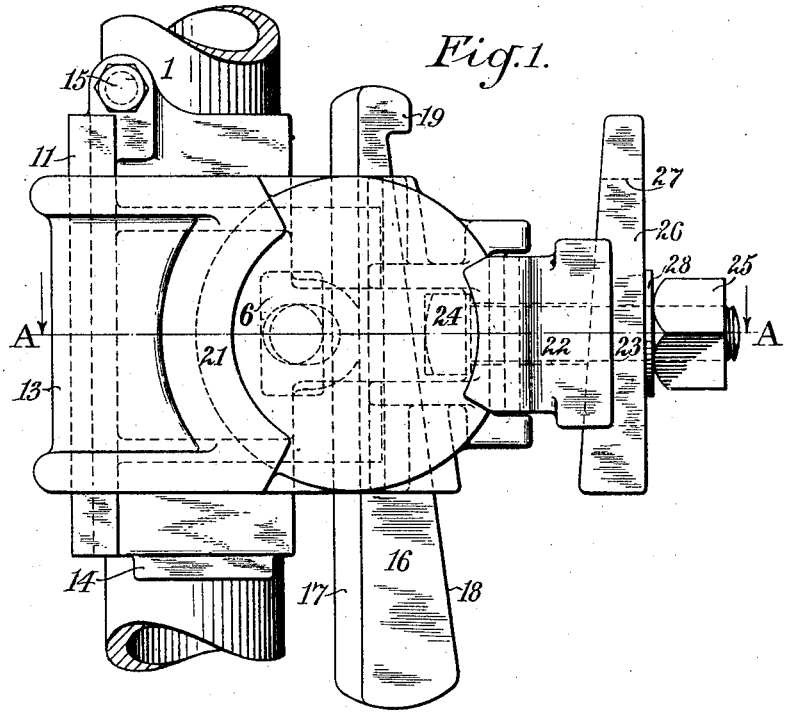
Figure 2:
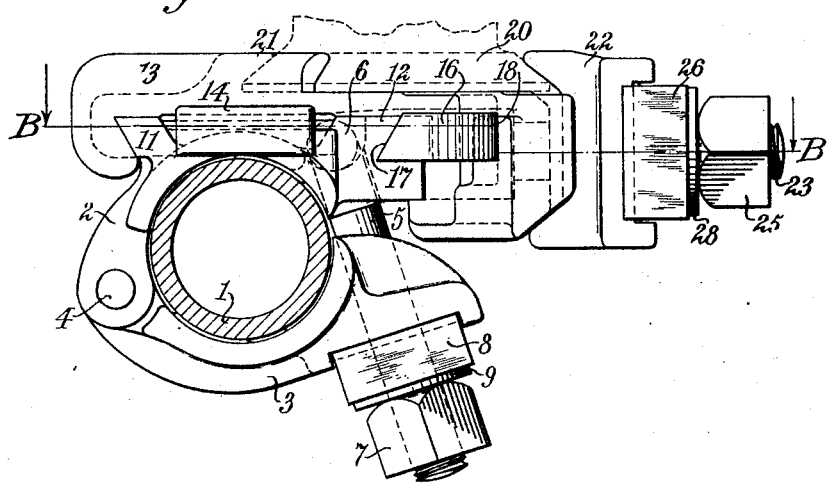

Figure 1 represents the mounting in top plan, a portion of its supporting arm being shown in side elevation, Fig. 2 is a side view of the mounting, the supporting arm being shown in transverse section and the drill shell cone being shown in dotted lines in its position within the saddle, Fig. 3 is a section taken in the plane of the line A—A of Fig. 1 looking in the direction of the arrows, Fig. 4 is a section taken in the plane of the line B—B of Fig. 2, looking in the direction of the arrows, and Fig. 5 is a view in perspective of the wedge key used for securing an instantaneous locking and releasing of the column arm clamp.

The column arm which is herein shown as forming the support for the mounting is denoted by 1. The clamp which embraces this arm comprises two members 2, 3, hinged at 4 and their free ends engaged by a bolt 5, the cross head 6 of which is seated in the clamp member and the nut 7 of which is engaged with the screw threaded end of the bolt beyond the clamp member 3.

The means which I have shown for securing an instantaneous locking and releasing of the clamp comprises a wedge key 8 interposed between the nut 7 and clamp member 3.

A washer 9 is preferably inserted between the nut 7 and the wedge key 8. This wedge key 8 is provided with an elongated slot 10 through which the bolt 5 passes.

The clamp member 2 is provided with parallel bevel guides 11, 12, on which the flat saddle 13 is slidably mounted. The flat member 2 is further provided with a fixed stop 14 for limiting the sliding movement of the saddle in one direction along the clamp and the clamp member is further provided with a removable stop 15, in the present instance a bolt for limiting the sliding movement of the saddle in the opposite direction. This bolt 15 may be unscrewed at any time to permit the insertion and removal of the saddle.

The saddle 13 is locked to and released from the clamp member 2 by means of a beveled wedge key 16, the beveled parallel side 17 of which engages the bevel guide 12 of the clamp member 2 and the tapered side 18 of which engages the tapered walls of the saddle 13. This wedge key 16 is provided with a head 19 at its smaller end for preventing the complete removal of the wedge key when in its released position.

The cone 20 of the drill shell is seated upon the saddle 13 and is engaged by a stationary jaw 21 and movable jaw 22. This drill shell cone 20 is locked to and released from the saddle 13 as follows:—A bolt 23 has its head 24 seated within the saddle 13, which bolt passes through the movable jaw 22 and is provided with a nut 25 on its screw threaded end exterior to said jaw. A wedge key 26 is interposed between the outer face of the movable jaw 22 and the nut 25, which key is provided with an elongated slot 27 through which the bolt 23 passes. A washer 28 is preferably inserted between the wedge key 26 and the nut 25.

In operation, the slide arm clamp is first locked to the arm 1 by a blow upon the large end of the wedge key 8 after the clamp has been adjusted to the proper position on the said arm. The saddle 13 with its drill may then be moved to either limit of its movement and there locked to the clamp by a blow upon the large end of the wedge key 16. The drill may be adjusted rotatively to the proper position with respect to the saddle and then locked in such position by a blow upon the large end of the wedge key 26. After the hole has been drilled to a depth sufficient to require the use of a longer drill steel, the drill may be withdrawn on its shell sufficiently to release the drill steel therefrom. A blow upon the small end of the wedge key 16 will immediately release the saddle from the saddle clamp. The saddle and drill may then be moved along the clamp a sufficient distance to bring the drill out of alinement with the hole being bored thus permitting the removal of the shorter steel and the insertion of a longer steel. The saddle, with the drill, may then be moved back to its original position and after the drill has been engaged with its drill steel and the saddle locked to the clamp, the operation of the drill may be proceeded with.

From the above description it will be seen that no adjustment of the drill is required each time a new steel is used and it will be furthermore seen that a very simple and quickly operated device is employed for locking the saddle to and releasing it from the clamp.

It will also be seen that very simple and quickly operated devices are employed for locking the clamp to and releasing it from its arm support and for locking the drill shell to and releasing it from the saddle.

What I claim is:—

1. In a drill mounting, a clamp, a saddle slidable thereon and a longitudinally slidable wedge key interposed between portions of the clamp and saddle for instantaneously locking the saddle to and releasing it from the clamp.

2. In a drill mounting, a clamp having parallel guides thereon, a saddle fitted to slide along the guides and a wedge key interposed between the saddle and one of the guides and slidable in the direction of the guides for instantaneously locking the saddle to and releasing it from the clamp.

In testimony, that I claim the foregoing as my invention, I have signed my name in presence of two witnesses, this 5th day of January, 1910.

CHARLES C. HANSEN.

Witnesses:
WM. C. MORRIS,
HARRY D. POWELL.

Copies of this patent may be obtained for five cents each, by addressing the "Commissioner of Patents, Washington, D. C."